Sept. 6, 1955
C. A. MILANO
2,716,937
COFFEE MAKER
Filed Dec. 16, 1952
2 Sheets-Sheet 2
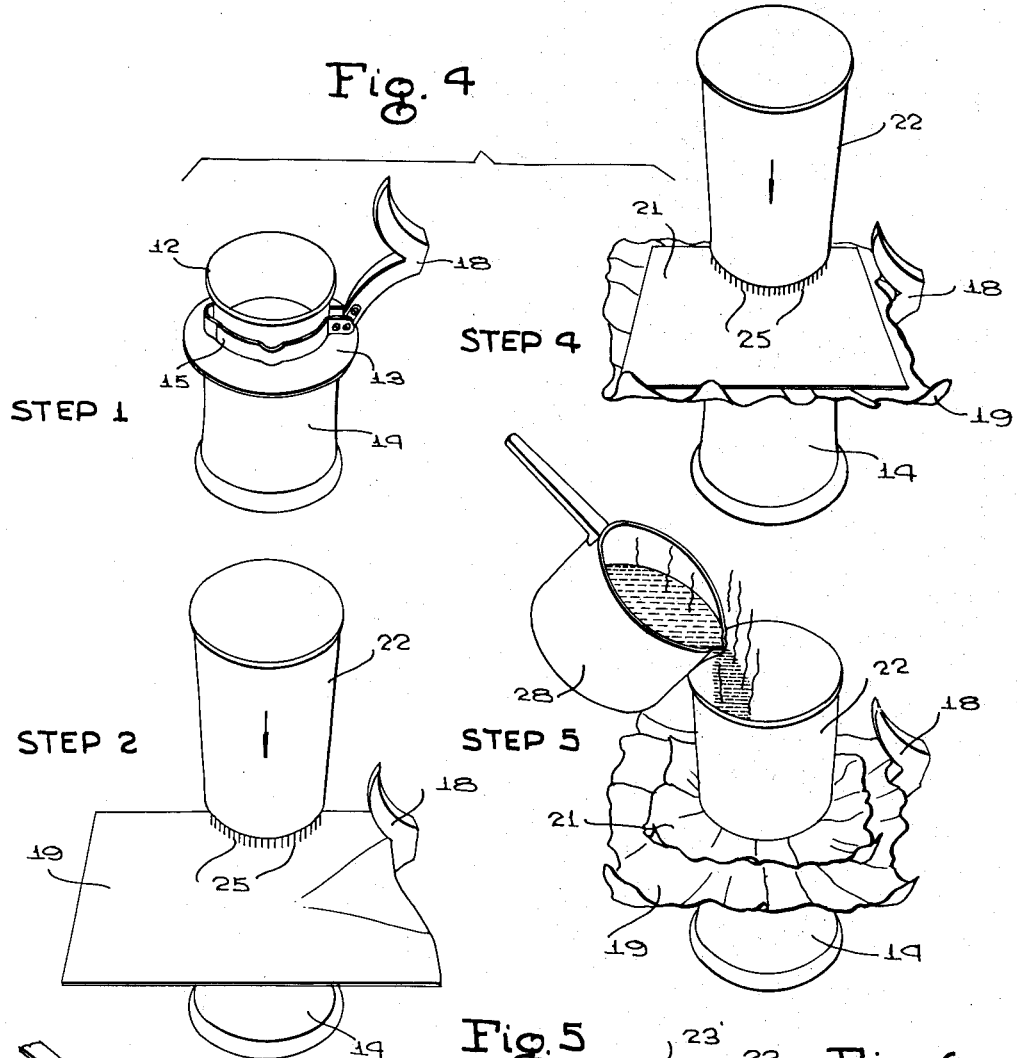
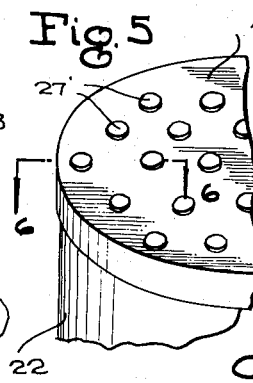
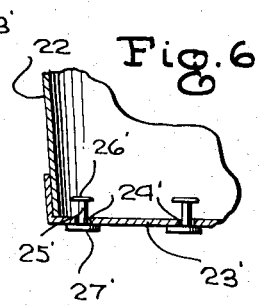
INVENTOR.
CESARE A. MILANO
BY
McMorrow, Berman + Davidson
ATTORNEYS

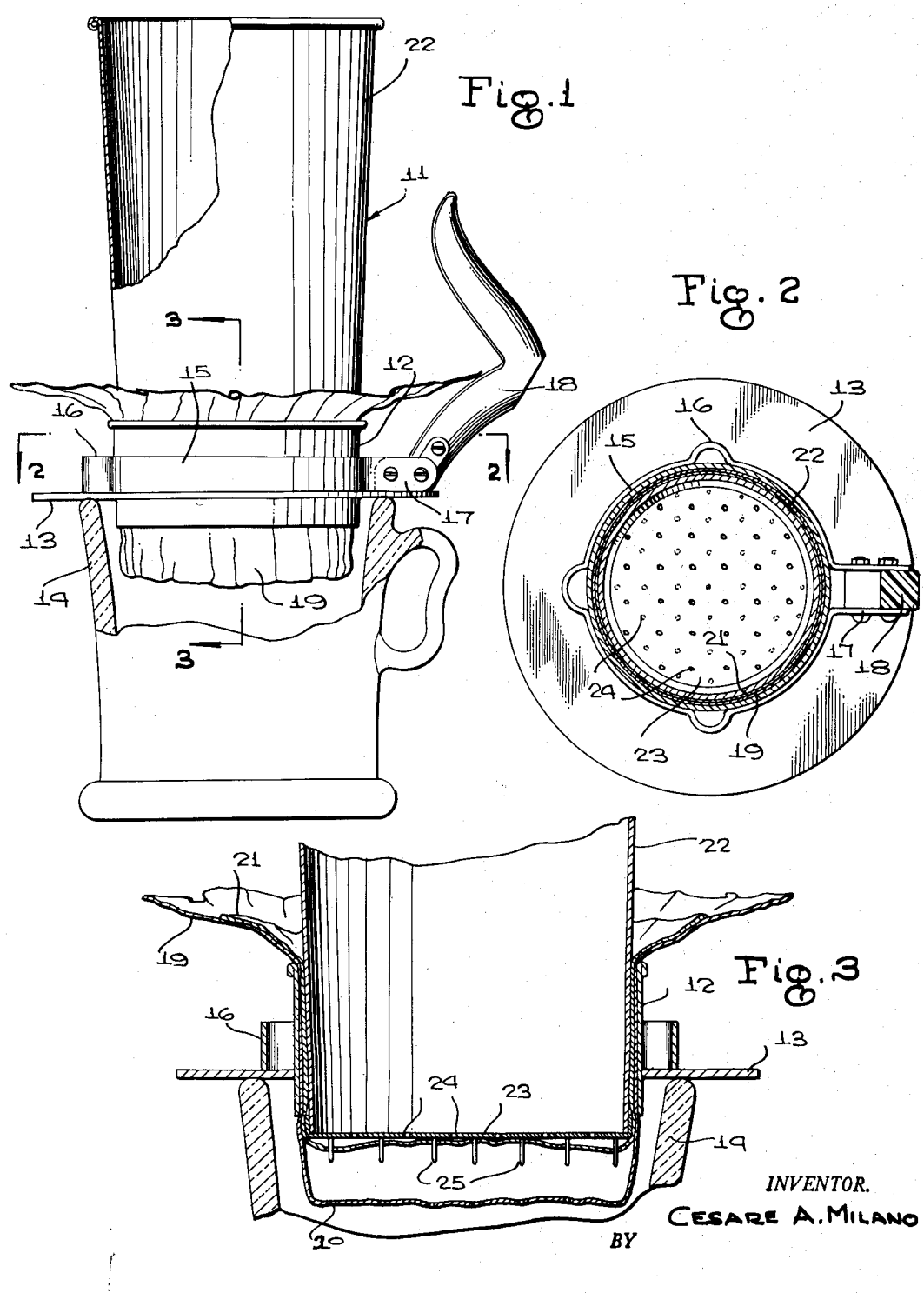

United States Patent Office 2,716,937
Patented Sept. 6, 1955

2,716,937

COFFEE MAKER

Cesare A. Milano, Atlantic City, N. J.

Application December 16, 1952, Serial No. 326,233

3 Claims. (Cl. 99—306)

This invention relates to beverage making apparatus, and more particularly to an improved apparatus particularly adaptable for preparing an infusion of coffee.

A main object of the invention is to provide a novel and improved apparatus for making individual cups of coffee which is simple in construction, which involves only a few parts, and which is easy to manipulate.

A further object of the invention is to provide an improved apparatus for making individual cups of coffee which involves inexpensive and disposable components, which provides economical use of coffee, and which enables the user to prepare a cup of coffee in a very short time.

Further objects and advantages of the invention will become apparent from the following description and claims, and from the accompanying drawings, wherein:

Figure 1 is a side elevational view, partly in vertical cross section, showing an improved coffee making apparatus according to the present invention in operative position.

Figure 2 is a horizontal cross sectional view taken on the line 2—2 of Figure 1.

Figure 3 is an enlarged vertical cross sectional view taken on the line 3—3 of Figure 1.

Figure 4 is a group of perspective views illustrating the successive steps involved in preparing a cup of coffee by the use of the apparatus of the present invention.

Figure 5 is a fragmentary perspective view of the bottom of a modified form of hot water receiving container forming part of a coffee making apparatus according to the present invention.

Figure 6 is an enlarged cross sectional detail view taken on the line 6—6 of Figure 5.

Referring to the drawings, and more particularly to Figures 1 to 4, the coffee making apparatus is designated generally at 11 and comprises an annular collar member 12 of substantial height, said collar member being formed with the outwardly projecting horizontal annular flange 13 extending from its intermediate portion, as shown in Figure 3, said flange 13 being adapted to engage the top rim of a cup 14 to support the collar member 12 thereon. Clampingly engaged around the collar member 12 above the flange 13 is the resilient band 15, said band being formed with a plurality of spring loops 16 to provide a substantial degree of resiliency for the band. Secured between the outwardly extending parallel ends 17, 17 of the band is the upstanding handle 18. It will be understood that the band 15 tightly engages the collar member 12 and that the handle 18 therefore is rigidly connected to the collar by means of said band 15.

Designated at 19 is a first sheet of porous paper which is disposed over the collar 12 and which is pressed downwardly through said collar in a manner presently to be described. As shown in Figure 3, the lower portion of the paper sheet 19 is formed with the uniformly spaced apertures 20 extending over its area. Designated at 21 is a second sheet of porous paper which is disposed over the first sheet 19, in the manner illustrated in Figure 3, being engaged against the portion of sheet 19 located adjacent the collar 12. Designated at 22 is a cup member of circular horizontal cross section which has a slight downward taper, as shown in Figure 1, the cup member 22 being tightly engageable in the collar 12 and acting to clamp the portions of the paper sheets 21 and 19 tightly against the collar, since said sheets are interposed between the cup member 22 and the inside surface of said collar. The bottom wall of the container 22 is designated at 23 and is formed over its area with the uniformly spaced apertures 24. Depending from the bottom wall 23 and rigidly secured thereto are the uniformly spaced vertical prongs 25 which, as illustrated in Figure 3, are adapted to penetrate through the second paper sheet 21, whereby hot water may drip through the punctured openings produced in the sheet 21 by the prongs 25.

Referring now to Figure 4, the first step in using the device consists of placing the collar member 12 on the top rim of the cup 14, said collar member being supported on said top rim by the flange 13, as above described. The second step consists of placing the paper sheet 19 over the collar member 12 and then puncturing said sheet by means of the container 22, the prongs 25 on the container being forced downwardly through the paper sheet 19 to form the apertures 20. The paper sheet 19 is thus formed into the position thereof shown in Figure 3, wherein a receptacle is defined in which a quantity of coffee, shown at 26, may be disposed in the cup element thus produced in the paper sheet 19. The quantity of coffee 26 is sufficient to produce a cup of coffee of the desired strength.

Referring now to step four, the second paper sheet 21 is then placed over the paper sheet 19 and the cup member 22 is again employed to force the second paper sheet downwardly into the collar 12, the prongs 25 of the cup member 22 penetrating the second paper sheet in the manner shown in Figure 3. The cup member 22 is left in the position thereof shown in step 5, and also shown in Figure 3, and then a quantity of hot water is poured into the cup member 22 from a suitable kettle 28. The hot water drips downwardly through the apertures 24 in the bottom wall 23 of the container 22 and thence through the porous paper sheet 21, as well as through the apertures in said paper sheet formed by the prongs 25. The hot water thus filters through the coffee contained in the space between the first paper sheet 19 and the second paper sheet 21 and becomes infused with the coffee grounds, the infused liquid then dripping through the apertures 20 in the first paper sheet 19 into the cup 14. The finished coffee of desired strength finally is deposited in the cup 14, after which the apparatus may be removed from the cup, allowing the user to drink the coffee.

Referring now to Figures 5 and 6, a modified form of bottom wall structure is illustrated for the cup 22. In Figure 5, the bottom wall of the cup 22 is designated at 23'. The bottom wall 23' is formed with the uniformly spaced apertures 24', and movably disposed in said apertures are the stud members 25', said stud members having the enlarged top and bottom head elements 26' and 27'. As shown in Figure 6, the bottom heads 27' are slightly larger in size than the upper heads 26'.

In using the modified form of cup member illustrated in Figures 5 and 6, the same procedure is followed as was described above in connection with the form of the invention shown in Figures 1 to 3, except that the paper sheets 19 and 21 are not perforated by the stud elements 25' but are merely indented thereby to provide localized areas of reduced thickness through which the liquid may drip. When the cup member is disposed in the apparatus in the manner illustrated in step five of Figure 4, the stud elements 25' are elevated because of their contact with the second paper sheet 21, and the hot water drips through the apertures 24' and thence through the paper sheet 21 into the space between sheet 21 and sheet 19 to infuse with the coffee grounds. The paper sheets 19 and 21 are of relatively soft, porous structure, whereby the liquid may drip through the sheets even if no perforations are present therein. As in the previously described form of the invention, the infused liquid finally drips through the bottom paper sheet 19 into the cup 14, providing the final desired product.

While certain specific embodiments of an improved coffee making apparatus have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A coffee making apparatus comprising a coffee cup, an annular collar member, means on said collar member engageable with the rim of the cup, a first sheet of disposable porous flexible material disposed in and extending outwardly over the rim of said collar member, said sheet being arranged to receive ground coffee, a second sheet of disposable porous flexible material disposed in and extending outwardly over said first sheet, a cup member shaped to fit inside said collar member, said cup member being tightly received inside said first and second sheets, said cup member having an apertured bottom wall, and depending projections on said bottom wall adapted to deform said second sheet to facilitate the flow of hot water therethrough.

2. A coffee making apparatus comprising a coffee cup, an annular collar member, means on said collar member engageable with the rim of the cup, a first sheet of disposable porous flexible material, said sheet being formed with perforations and being disposed in and extending outwardly over the rim of said collar member, said sheet being arranged to receive ground coffee, a second sheet of disposable porous flexible material disposed in and extending over said first sheet, a cup member shaped to fit inside said collar member, said cup member being tightly received inside said first and second sheets, said cup member having an apertured bottom wall, and depending prongs on said bottom wall adapted to penetrate through said second sheet to facilitate the flow of hot water therethrough.

3. A coffee making apparatus comprising a coffee cup, an annular collar member, an outwardly projecting horizontal annular flange on said collar member formed and arranged to engage on the rim of the cup to support the collar member in said cup, a first sheet of disposable porous flexible material, said sheet being formed with perforations and being disposed in and extending over the rim of said collar member, said sheet being arranged to receive ground coffee, a second sheet of disposable porous flexible material disposed in and extending over said first sheet, a cup member shaped to fit inside said collar member, said cup member being tightly received inside said first and second sheets, said cup member having an apertured bottom wall, and depending prongs on said bottom wall adapted to penetrate through said second sheet to facilitate the flow of hot water therethrough.

References Cited in the file of this patent

UNITED STATES PATENTS

| | | |
|---|---|---|
| 84,830 | Jones | Dec. 8, 1868 |
| 463,950 | Hutchings | Nov. 24, 1891 |
| 857,676 | Rogers | June 25, 1907 |
| 1,885,666 | Wood | Nov. 1, 1932 |